United States Patent [19]

Guile et al.

[11] Patent Number: 4,821,512
[45] Date of Patent: Apr. 18, 1989

[54] PILOTING IGNITER FOR SUPERSONIC COMBUSTOR

[75] Inventors: Roy N. Guile, Wethersfield; William T. Peschke, Manchester, both of Conn.

[73] Assignee: United Technologies Corporation, Hartford, Conn.

[21] Appl. No.: 46,072

[22] Filed: May 5, 1987

[51] Int. Cl.⁴ .......................... F02K 7/10; F02C 7/264
[52] U.S. Cl. ..................................... 60/270.1; 60/736; 60/39.826
[58] Field of Search ................. 60/270.1, 39.826, 750, 60/736, 740, 746

[56] References Cited

U.S. PATENT DOCUMENTS

| | | | |
|---|---|---|---|
| 2,420,445 | 1/1947 | Bailey | 60/39.826 |
| 2,679,137 | 5/1954 | Probert | 60/39.826 |
| 2,692,480 | 10/1954 | Viaud et al. | 60/270.1 |
| 2,984,979 | 5/1961 | Babcock et al. | 60/39.826 |
| 3,075,353 | 1/1963 | Mullaney et al. | 60/270.1 |

Primary Examiner—Louis J. Casaregola
Attorney, Agent, or Firm—Edward L. Kochey Jr.

[57] ABSTRACT

A piloting fuel injector assembly for a supersonic ramjet engine has a cowl 24, 70 confining a pilot air portion of the airstream. A conical member 34, 74 produces a subsonic recirculation zone 30, 76 and a shock wave falling within the cowl. Pilot fuel injected 40, 82 upstream of the recirculation zone burns stoichiometrically. The exhaust 38, 86 from the cowl is sonic, producing a shock wave which facilitates ignition of the main fuel injected 46, 84 upstream of the cowl exhaust.

16 Claims, 3 Drawing Sheets

FIG. 4
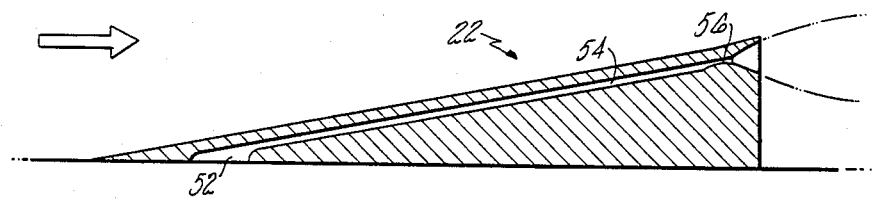
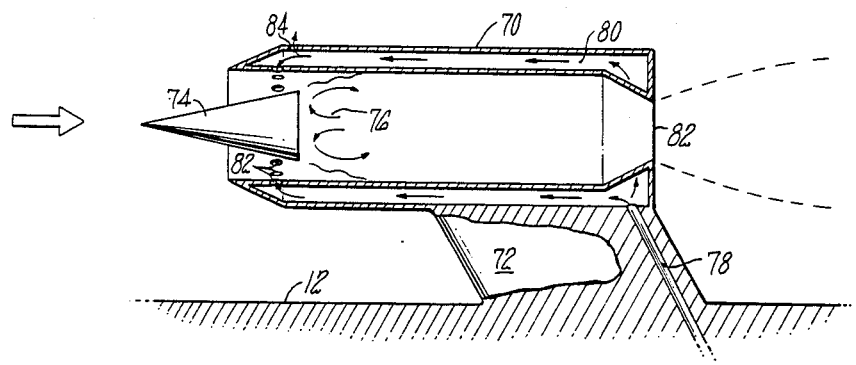
FIG. 5

PILOTING IGNITER FOR SUPERSONIC COMBUSTOR

DESCRIPTION

Technical Field

The invention relates to supersonic combustion ramjet engines and in particular to a piloting fuel injector assembly therefor.

Background Art

Missile applications exist for which a liquid hydrocarbon fueled supersonic ramjet engine offers significant performance advantage. Many of these applications impose demanding volume constraints which severely limit available combustor length.

Prior art systems use two separate air inlet systems, one feeding a supersonic combustor, and the other feeding a subsonic combustor. Approximately 25 percent of the engine airflow is delivered to the subsonic combustor where it reacts, highly fuel rich, with the entire engine fuel flow. The fuel rich combustion products then mix and react with the supersonic combustor airflow.

Other prior art systems require difficult-to-handle pyrophoric-fuel additives to enhance the ignition characteristics of fuel admitted to the supersonic combustor. In this case, the additional fuel system imposes a weight penalty on the propelled vehicle.

Since the subsonic combustor is less efficient at high flight speeds than the supersonic combustor, this high proportion of air passing to the subsonic combustor leads to a relatively poor efficiency of the ramjet engine. The plural air inlets for the two airflow paths leads to the potential of adverse interaction between the separate air inlet systems.

DISCLOSURE OF INVENTION

A piloting fuel injection assembly for a supersonic ramjet engine is located within a supersonic airflow at a combustor entrance accepting air directly from a supersonic inlet and confines a minor pilot portion of the airflow within a cowl. A downstream facing step is located within the confined pilot flow and forms a recirculation zone. Upstream of the recirculation zone a stoichiometric amount of pilot fuel is injected with the recirculation zone sized for sufficient residence time to permit ignition of the fuel.

The cowl has the pilot air exit facing downstream, and a main fuel supply is injected into the supersonic airflow from an upstream edge of the cowl. This fuel flow is preferably pumped under pressure and heated while still under pressure to maintain its liquid state. Restrictions at the outlet in the form of orifices cause it to flash to vapor at the low surrounding pressure.

The pilot airflow within the recirculation zone is subsonic and choked at the outlet from the cowl. Accordingly, a sonic velocity exists at the outlet with a high pressure compared to that of the surrounding flow. This causes a shock wave to be formed in the surrounding supersonic flow raising the temperature and pressure of that flow and, in combination with mixing between the hot pilot airflow and the surrounding flow, facilitates ignition of the fuel in the surrounding flow.

BRIEF DESCRIPTION OF THE DRAWINGS

FIG. 4 is a sectional view of a flash vaporizing fuel injector located downstream in the engine; and FIG. 5 is an alternate strut mounted piloting fuel injector assembly.

BEST MODE FOR CARRYING OUT THE INVENTION

Figure 1:
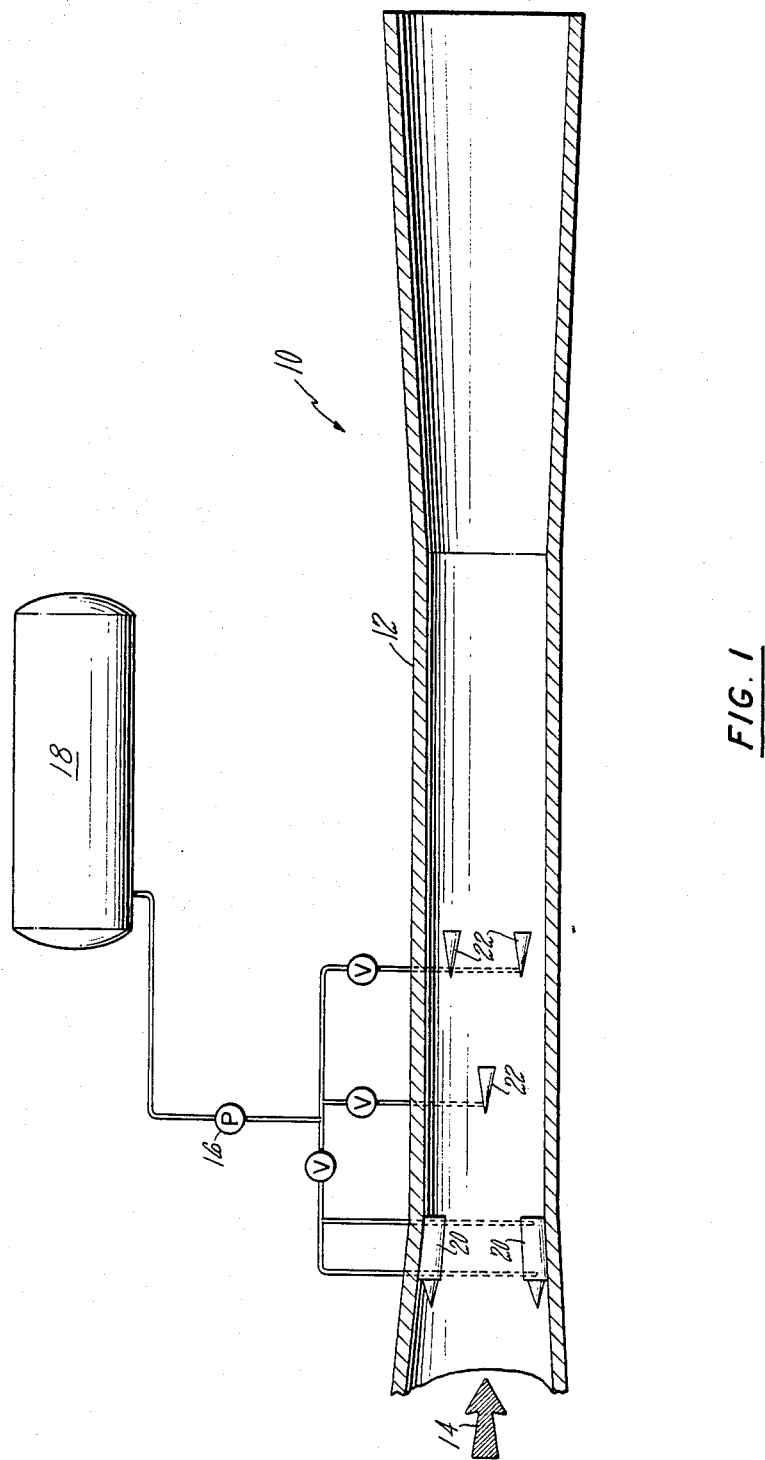
FIG. 1 is a sectional general arrangement of the supersonic ramjet engine.

In FIG. 1 there is illustrated a supersonic ramjet engine 10 which has a wall 12 confining a supersonic airflow 14. Liquid hydrocarbon fuel is delivered under pressure by pump 16 from fuel tank 18. Three piloting fuel injectors 20 are equally spaced around the circumference at an upstream location, with additional fuel injectors 22 located at downstream locations as required. The maximum amount of fuel is injected through the piloting fuel injector 20 consistent with avoiding choking of the engine, and additional fuel as required is introduced through the downstream injectors 22. To facilitate ignition of the fuel injected through the downstream injectors 22, these injectors are located in regions where the local temperature and pressure have been increased as a consequence of the combustion produced by the upstream piloting fuel injectors 20.

Figure 2:
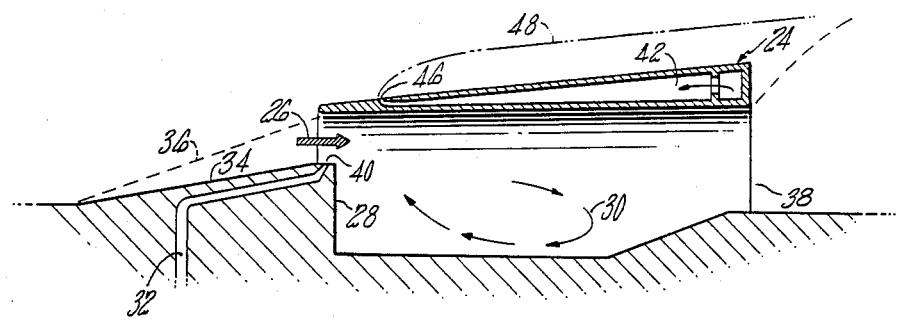
FIG. 2 is a sectional view through the piloting fuel injector assembly.
Figure 3:
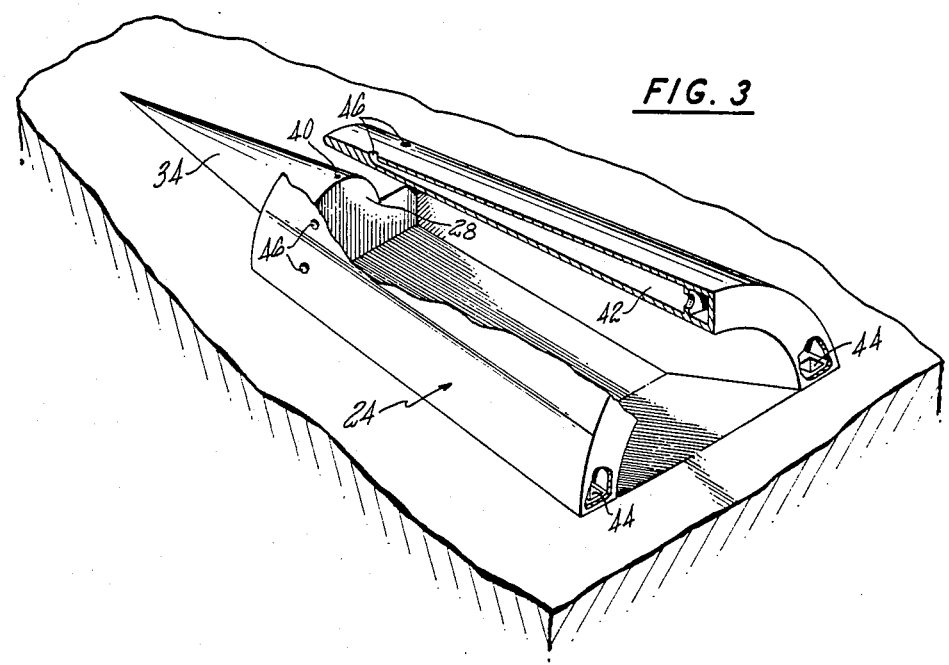
FIG. 3 is an isometric view of the piloting fuel injector assembly.

In FIG. 2 there is shown a semicircular cowl 24 which confines a pilot airflow 26. A flow disturbing means in the form of a downstream facing surface 28 or step causes recirculation zone 30 to form. The step is formed at the base of a 10 degree cone 34 having its point facing upstream. The cone is located so that shock wave 36 falls on or within cowl 24. Other shapes of the cowl and forms other than a cone could alternatively be used.

A supply of pilot fuel amounting to 2.5 percent of the total combustor fuel flow for each of the three injectors in introduced through conduit 32 at a location upstream of the recirculation zone. This fuel is burned stoichiometrically within the subsonic recirculation zone area within the cowl. Because this piloting airflow section uses a supersonic inlet, the pressure within the pilot is sufficient to choke the pilot at the exhaust 38 of the cowl. This high pressure choked flow causes the pilot gases to expand into the mainstream thereby increasing the local static temperature and pressure of the mainstream.

The pilot fuel is introduced through orifice 40 into the inlet flow which separates at the intersection of the conical surface and the semicircular cone base 28, initiating the development of a shear layer that extends downstream adjacent to the boundary of the recirculation zone 30. At the downstream end of the recirculation zone, is the rear stagnation point. Calculation of the recirculation zone length and its width permit determining the recirculation zone residence time. Mass exchange occurs through the shear layer resulting in entry of fuel which was injected upstream of the step 28 into the recirculation zone region. Upon ignition, the stationary turbulent flame is anchored near the cone base where the velocity entering the recirculation zone equals the flame propagation velocity. Because of velocity gradients in the shear layer the flame is stretched downstream. The mass exchange between the recirculation zone and the external flow occurs at an average velocity which is related to the flow velocity adjacent to the recirculation zone. Stable flame propagation is achieved when the turbulent flame speed equals or exceeds the mass exchange velocity.

In the specific embodiment described the inside diameter of the ramjet engine in the area of the injectors is 3.92 inches and the inside radius of the cowl is 0.5 inches at its entrance and 0.7 inches at its exit. The ratio of the flow area at the base of the conical forebody to the cowl capture area is 0.54. The half cone base height is 0.37 inches and the additional recess is 0.15 inches resulting in a 0.52-inch step. The residence time within the recirculation zone is calculated and compared to the ignition time for the fuel mixture being supplied at the Mach range for which the ramjet is to operate. The residence time must exceed the calculated ignition delay in order for auto ignition of the mixture to occur.

This is based on conditions occurring at the onset of internal subsonic flow. The assumption would normally include the recirculation zone static temperature without combustion approaching the recovery temperature of the inlet flow which is 85 percent of the stagnation temperature. This establishes auto ignition of the fuel with combustion then resulting in an even higher temperature.

The cowl 24 has located within it a plurality of fuel passageways 42. A main flow of fuel enters through inlet 44 being distributed to the plurality of passages 42 passing through the length of the cowl and exiting through orifices 46. The fuel in its passage is heated both from the internal pilot flame and from the external hot gases thereby increasing its temperature. Because of the high pressure fuel pump and the orifice discharge it remains at high pressure as a liquid, and passing from the approximately 900 psi pressure into the supersonic stream having a pressure of approximately one atmosphere, the fuel immediately flashes to vapor, thereby facilitating ignition.

The orifice 46 operates to maintain sufficient back pressure to avoid vaporization of the fuel within the heated passages 42. Therefore, local volume increases and the associated instability between parallel flow paths is avoided.

The fuel flows in a mainstream fuel jet 48 downstream mixing with the supersonic airflow toward the downstream end of the cowl. At this downstream location to the expanding gas from the pilot airflow causes a shock wave to occur in the mainstream flow. This shock wave preconditions the mainstream flow by increasing the local temperature and pressure of the mainstream flow and, as the preconditioned mainstream flow mixes with the hot, reactive species from the pilot, causing ignition of the mainstream flow.

As shown in FIG. 4 the downstream fuel injectors 22 include a fuel inlet 52 and a flow passage 54 which convey the fuel through orifice 56 from which it is discharged into the supersonic flow. The fuel passages 54 are located near the surface of the half conical member with heat transfer occurring through the surface thereby heating the fluid while orifice 56 retains it at high pressure. As it passes to the relatively low external pressure this also is flashed into vapor to facilitate ignition thereof.

An alternate embodiment of the piloting fuel injector is shown in FIG. 5. A hollow cylindrical cowl 70 is supported from the wall 12 on a strut 72. A conical flow disturbing means 74 is supported at an upstream location within the cowl 70 with recirculation zone 76 being established downstream of the cone. The fuel feed 78 passes through the strut 72 and longitudinally through the cowl through passages 80 to an upstream location in the cowl. A pilot portion of the flow passes through orifice 82 into the pilot airflow area where it is burned within air recirculation zone 76. The remainder of the fuel passes outwardly through orifice 84 into the supersonic flow path as the main fuel. Sonic velocity occurs at outlet 86 which causes a shock wave facilating ignition of the main fuel.

We claim:

1. A piloting fuel injector assembly for a supersonic ramjet engine, located within a supersonic airflow delivered directly from a supersonic inlet confined by a combustor wall, comprising:

means for supplying a selected pilot fuel feed rate to said injector;

an impervious pilot air confining means located within said airflow, open directly upstream, receiving and confining a pilot air portion of said airflow, in parallel flow relationship with the remaining exterior supersonic portion of said airflow;

said pilot air confining means having a downstream discharge opening in parallel flow relationship with said remaining exterior supersonic portion of said airflow;

a downstream facing flow disturbing means located within the confined flow of said pilot air confining means, whereby a flow recirculation zone is formed;

means for introducing said pilot fuel at a location upstream of at least a portion of said recirculation zone;

means for supplying a second main fuel flow into said supersonic airflow at a location upstream of said discharge opening;

a fuel flow path through said pilot air confining means;

means for supplying said second main fuel to one end of said fuel flow path; and a plurality of outlets at the other end of said fuel path whereby fuel heated in passing through said fuel flow path is discharged into said exterior supersonic airflow portion.

2. A piloting fuel injector assembly as in claim 1:
   said exterior supersonic airflow portion being at a first pressure; and
   said pilot air portion within said pilot air confining means being above said first pressure.

3. A piloting fuel injector assembly as in claim 1:
   said pilot air confining means comprising, a semicircular cowl secured to said wall.

4. A piloting fuel injector assembly as in claim 3:
   a half conical form secured to said wall, with the point of said half conical form upstream and the base of said half conical form forming said downstream facing flow disturbing means.

5. A piloting fuel injector assembly as in claim 4:
   the shock wave formed by the upstream end of said half conical form falling within said cowl.

6. A piloting fuel injector assembly as in claim 4:
   said half conical form having a plurality of pilot passageways therethrough near the surface of said half conical form, said pilot passageways having an outlet adjacent to the base of said half conical form; and means for introducing said pilot fuel into said pilot passageways.

7. A piloting fuel injector assembly as in claim 6:
each of said pilot passageways having an orifice at the outlet end of each pilot passageway.

8. A piloting fuel injector assembly as in claim 4:
said half conical form having a surface forming substantially a 10 degree angle from the axis of said half conical form.

9. A piloting fuel injector assembly as in claim 3:
said outlets being at an upstream location on said cowl with respect to the supersonic airflow.

10. A piloting fuel injector assembly as in claim 2:
a high pressure pump for supplying fuel to said fuel flow paths; and
said plurality of outlets each having an orifice, whereby the fuel is heated in passing through said passageways and vaporized on depressurization as it passes from the high pressure passageway to the first pressure exterior supersonic airflow portion.

11. A piloting fuel injector assembly as in claim 1:
said pilot air confining means comprising, a hollow cylindrical cowl; and
a strut supporting said cowl from said wall.

12. A piloting fuel injector assembly as in claim 11:
said downstream facing flow disturbing means comprising a conical member supported at the entrance to said cowl.

13. A piloting fuel injector assembly as in claim 11:
fuel flow paths having an orifice at the outlet of said fuel flow path.

14. A piloting fuel injector assembly as in claim 2:
an at least partial conical form located at the entrance to said pilot air confining means, with the point of said at least partial conical form upstream, and with the base of said at least partial conical form forming said downstream facing flow disturbing means; and
the shock wave formed by the upstream end of said at least partial conical form falling within said pilot air confining means.

15. A piloting fuel injector assembly as in claim 2:
said plurality of outlets being at an upstream location on said pilot air confining means with respect to the supersonic airflow.

16. A piloting fuel injector assembly as in claim 11:
said means for introducing pilot fuel including means for also supplying pilot fuel to one end of said fuel flow path; and
an additional plurality of outlets at the other end of said fuel flow path in fluid communication with said pilot air portion of said airflow.

* * * * *